S. B. BOWMAN.
GLASS FURNACE.
APPLICATION FILED AUG. 1, 1914.
1,166,576.
Patented Jan. 4, 1916.
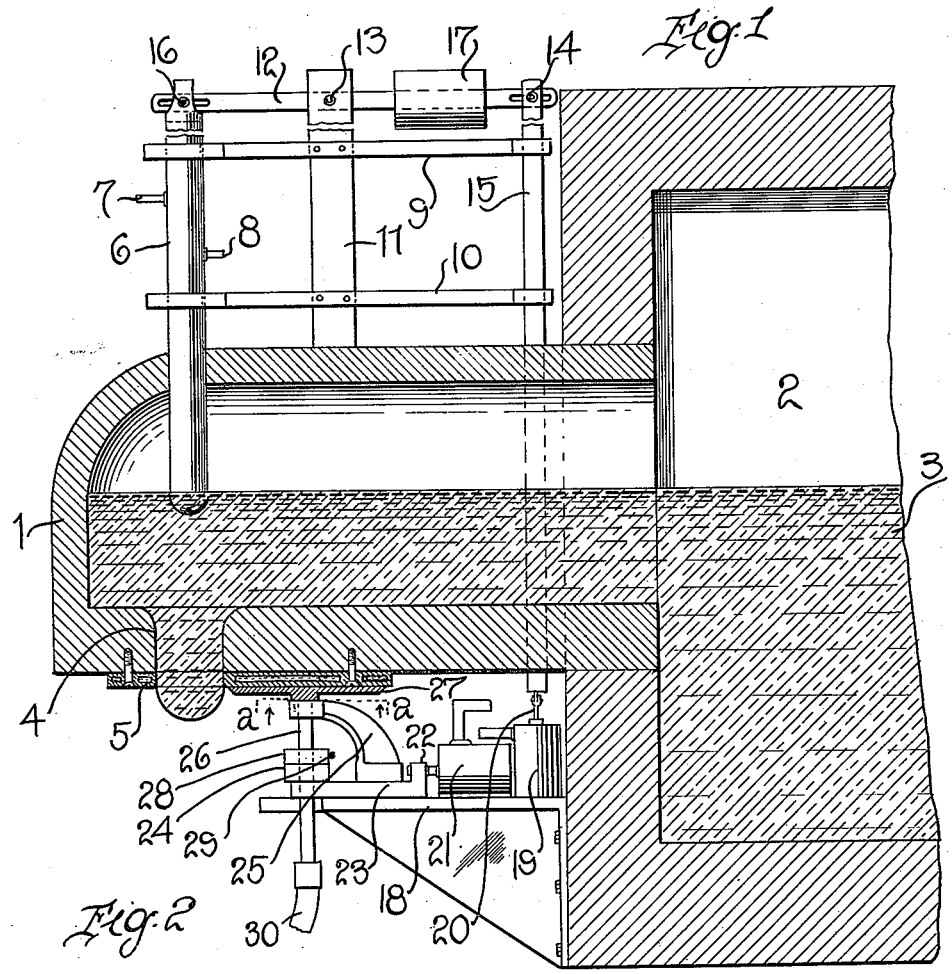
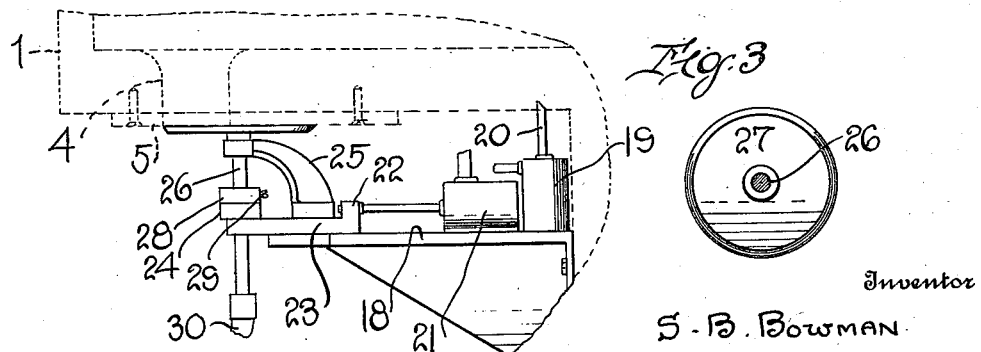
Inventor
S. B. Bowman
Witnesses
Robert M. Sutphen
A. J. Hind
By Watson E. Coleman
Attorney

UNITED STATES PATENT OFFICE.

SAMUEL B. BOWMAN, OF BLACKWELL, OKLAHOMA.

GLASS-FURNACE.

1,166,576. Specification of Letters Patent. Patented Jan. 4, 1916.

Application filed August 1, 1914. Serial No. 854,489.

*To all whom it may concern:*

Be it known that I, SAMUEL B. BOWMAN, a citizen of the United States, residing at Blackwell, in the county of Kay and State of Oklahoma, have invented certain new and useful Improvements in Glass-Furnaces, of which the following is a specification, reference being had to the accompanying drawings.

My invention relates to certain new and useful improvements in glass furnaces, and more particularly to the means employed therewith for regulating the delivery of molten glass, and severing predetermined quantities intermittently to be transferred to molds.

With these objects in view, my invention consists in the details of construction and mode of operation hereinafter more fully described.

In order that those familiar with the art to which my invention appertains may fully understand the construction, mode of operation and advantages, I will now proceed to describe the same, referring by numerals to the accompanying drawing, in which—

Figure 1 represents a sectional view of the snout and a portion of a glass furnace with my improvements connected therewith and showing the glass severing devices in open position; Fig. 2 is a similar view showing the severing devices in the position assumed in severing a quantity of molten glass, and Fig. 3 is a detail section on line *a—a* of Fig. 1.

Similar reference numerals indicate like parts in all the figures of the drawing.

1 represents the snout of an ordinary glass furnace and 2 the main tank.

3 represents a quantity of molten glass flowing from the tank, and 4 the orifice or throat in the bottom of the snout through which the molten glass is delivered.

5 is a metal plate secured to the under side of the snout 1, and is provided with an orifice in alinement with the throat 4, somewhat larger in area than the throat, and which may preferably be artificially cooled by water in any desired manner to prevent the glass from adhering to it, except a thin film.

6 is a hollow plug provided with inlet tube 7 and outlet tube 8 by means of which water may be admitted to the plug and permitted to escape in an obvious manner and for the purpose of cooling the plug so that in such condition it will chill the adjacent glass and thus receive a coating of chilled glass producing a larger plug and one which would have a longer life in use. This plug is used for the usual purpose, but its movements are controlled by novel means consisting of guide bars 9 and 10, secured in horizontal position by an upright support 11. It will be seen that by the means above described I provide a water cooled plug having a temperature sufficiently below that of the molten glass surrounding it as to chill the surrounding glass and cause the glass to adhere to the plug and gather thereon to a degree sufficient to form practically a glass plug. By this means I prevent the metal of the plug from being burned away and also prevent this metal from streaking into the molten glass. Within the upper end of this support a bar 12 is pivoted at 13 to the support or upright 11, and at its rear end 14 to a vertical bar 15, to be presently referred to, and it is also pivoted at 16 to the upper end of the plug 6. Secured preferably adjustably to the bar 12 is a weight 17, the purpose of which is to cause the plug to be raised as will be presently explained.

Arranged below the snout 1 is a suitable shelf or support 18, upon which is mounted a compressed air cylinder 19 having a vertically movable piston 20 connected with the lower end of the bar 15, and this air cylinder is provided with any well known means by which the piston is caused to reciprocate.

From the construction and arrangement thus far described, it will be readily seen that when the piston 20 is caused to rise it will lift the bar 15 at its rear end and rock it upon its pivot 13 to force the plug 6 down into or toward the throat 4 in the bottom of the snout, and when air pressure in the cylinder 19 is released, the weight 17 will return the bar 12 and cause the plug to be raised out of the throat. Mounted upon the table 18 is another compressed air cylinder 21, the piston of which is connected, as shown at 22 with a slidable bar 23 mounted in suitable guides upon the table 18, which has secured to it or formed therewith a boss 24 and a curved arm or bracket 25, which together serve as a support for a cylindrical rod 26, which is journaled in the boss and bracket and is provided at its upper end preferably with a disk knife 27. Secured to the rod is a collar 28, which is adjustable upon the rod for the purpose of compensating for any wear, by an ordinary set screw 29. The knife rod 26 is connected to an ordinary flexible shaft 30 operated by any suitable motive force (not shown).

From the construction and arrangement just described, it will be understood that when a desired body of molten glass has been delivered through the throat 4, the bar 23, through the medium of its connection with the air cylinder 21, is moved to the position shown in Fig. 2, while at the same time the disk knife 27 is being rotated, and consequently the desired quantity of glass is cut off, close to the plate 5, and the throat 4 is closed by the knife and the flow of glass suspended until the knife and its supports are retracted, whereupon the molten glass will again flow and so on. When the operation of cutting off the flowing glass is to be suspended, the piston of the air cylinder 19 is caused to rise and accordingly through the instrumentalities heretofore described the plug 6 is caused to close the throat.

While I have shown the knife 27 as one designed to be rotated and prefer such construction, it will be understood that an ordinary non-rotatable knife may be reciprocated by the means described, and the flexible shaft dispensed with. The design in cross section of the throat 4 and plug 6 may be round, square or of any preferred form. I desire at this point to call attention to the fact that the plate 5 against which the knife 27 reciprocates and rotates is chambered as at 5ª, this chamber being adapted to receive cooling water whereby the plate 5 may be kept cool, the cooling of this plate 5 also serving to keep the knife 27 cool. If it were not for this plate being cooled both the knife and the plate against which the knife reciprocates would become so hot that the molten glass would adhere to them as soon as the apparatus was put in motion and thus prevent them from severing the glass, as the glass would simply hang from the plate and "string" like thick molasses. Furthermore, were the plate too hot or the blade too hot the molten glass would carry off from the blade and plate impurities which would act to discolor the glass. The several attachments may in any suitable manner be secured in operative relation with the furnace.

It will of course be understood that the plug 6 may be operated to control the amount of glass to be delivered to the action of the knife, or to entirely cut off the flow for any definite time, but that by reason of the cooling of said plug by the flow of water, the cooled metal of the plug will gather about it a film of chilled glass, the thickness of which will depend upon the degree of temperature maintained in the plug, and the plug thus coated with a film of glass colder than the body of molten glass through which it moves, there will be no streaking or marking of the delivered glass frequently occurring as at present. The glass will also be delivered in a lump or approximately so, rather than as at present, in a long continuous flow, thus eliminating the tendency to "lap markings", etc.

As heretofore stated, the plug may be used when desired, to cause the flow of glass to entirely cease, but it will be obvious that by reason of the plug being kept partially submerged in the molten glass the downward movement when it is used to close or partially close the throat temporarily will tend to give an impulse to the downward flow of the glass. When the molten metal or glass is of such temperature, and in such condition to be delivered without any extraneous impulse given to it, the operation of the air cylinder 19 may be suspended and consequently the plug 6 will remain stationary, and the reciprocation of the knife will constitute an intermittent cutoff. Particular attention is called to the fact that the gate or knife 27 forms a combined cutting and delivering device which performs all of its given duties for each piece of ware made by the machine to which it delivers the knife, making from ten to twenty complete oscillations per minute. Thus my device is a severing and retaining device complete in itself.

Many variations may be made in the mere details of construction of the several parts of the apparatus without departing from the main features of my invention as heretofore described, for instance while I have shown the bar 15 of a fixed length and connected at its lower extremity with the air cylinder 19, it may be made adjustable at any locality between the cylinder and its connection with the bar 12, in order that if for any reason the air cylinder should become ineffective, the bar 15 could be operated manually or by any other means. Again if thought desirable a motive force other than compressed air may be used to operate the bar 15 and the knife 27.

What I claim as new however, and desire to secure by Letters Patent is:—

1. In a glass furnace, the combination with a snout having a delivery opening, of a vertically reciprocatable hollow fluid cooled plug disposed in alinement with the opening, the plug for a length from its lower end greater than the thickness of the wall of the delivery opening having a diameter less than that of the opening whereby chilled glass may gather upon the plug to form a part thereof.

2. In a glass furnace, the combination with a snout having a downwardly extending delivery opening, of a vertically reciprocatable hollow metallic plug disposed in alinement with the opening, said plug for a distance upward from its lower end greater than the thickness of the wall of said delivery opening having a uniform diameter less than the diameter of the delivery opening, and means for circulating cooling fluid within the plug whereby to cause the gathering of chilled glass upon the plug.

3. In a glass furnace, the combination with a snout having a vertically extending delivery opening, the upper end of the delivery opening being flared, of a vertically reciprocatable hollow plug disposed in alinement with the opening, said plug having a rounded lower end and the lower end of the plug for a distance equal to the thickness of the wall of said delivery opening having a uniform diameter less than the delivery opening, and means for circulating cooling water within the plug whereby to cause the gathering of chilled glass upon the plug.

4. In a glass furnace, the combination with a snout having a discharge opening and a flat reciprocating knife disposed exteriorly to the snout, of a water cooled plate disposed against the snout, said plate having a flat under surface with which the flat upper surface of the knife contacts and having an opening registering with the opening in the snout, that portion of the plate to one side of said opening having an area equal to that of the knife, and means for reciprocating the knife across the face of the plate to first sever the glass passing through the opening of the plate and then close said opening to retain the glass within the snout, the knife at all times being in contact with the water cooled plate.

5. In a glass furnace, a snout having a delivery opening and a plug controlling the flow of glass through said opening, a lever pivoted at one end to the plug and at the opposite end to a vertically reciprocating bar, a weight intermediate the ends of the lever, and a compressed air cylinder connected with the lower end of the reciprocating bar whereby to adjust said lever.

6. In a glass furnace, the combination with a snout having an opening, of a water cooled plate disposed upon the under face of the snout, said plate having an opening registering with the opening in the snout, the under face of the plate being flat and a rotatable circular knife having a flat upper face contacting at all times with the flat under face of the plate, the area of the plate to one side of the opening being equal to that of the knife, and means for simultaneously rotating and reciprocating said knife.

In testimony whereof I hereunto affix my signature in the presence of two witnesses.

SAMUEL B. BOWMAN.

Witnesses:
 JOHN W. CARNAHAN,
 GEO. C. CRAWFORD.